US012755003B2

(12) United States Patent
Klonowski et al.

(10) Patent No.: US 12,755,003 B2
(45) **Date of Patent: *Oct. 6, 2026**

(54) SELECTIVE IMPORT/EXPORT ADDRESS TABLE FILTERING

(71) Applicant: Open Text Inc., Menlo Park, CA (US)

(72) Inventors: Eric Klonowski, Broomfield, CO (US); Ira Strawser, Thorton, CO (US)

(73) Assignee: Open Text Inc., Menlo Park, CA (US)

( * ) Notice: Subject to any disclaimer, the term of this patent is extended or adjusted under 35 U.S.C. 154(b) by 40 days.

This patent is subject to a terminal disclaimer.

(21) Appl. No.: 18/431,663

(22) Filed: Feb. 2, 2024

(65) Prior Publication Data

US 2024/0176875 A1 May 30, 2024

Related U.S. Application Data

(63) Continuation of application No. 18/304,231, filed on Apr. 20, 2023, now Pat. No. 11,928,206, which is a continuation of application No. 16/683,816, filed on Nov. 14, 2019, now Pat. No. 11,636,197.

(60) Provisional application No. 62/768,066, filed on Nov. 15, 2018.

(51) Int. Cl.
*G06F 21/54* (2013.01)
*G06F 21/55* (2013.01)

(52) U.S. Cl.
CPC ............ *G06F 21/54* (2013.01); *G06F 21/554* (2013.01); *G06F 2221/033* (2013.01)

(58) Field of Classification Search
CPC ...... G06F 21/54; G06F 21/554; G06F 21/566; G06F 2221/033; G06F 9/44521; G06F 12/1018
See application file for complete search history.

(56) References Cited

U.S. PATENT DOCUMENTS 9,465,717 B2 * 10/2016 Delio, Jr. ............ G06F 11/3466
11,636,917 B2 * 4/2023 Costello ............ G06F 18/24147 706/16

* cited by examiner

*Primary Examiner* — Pramila Parthasarathy
(74) *Attorney, Agent, or Firm* — Sprinkle IP Law Group

(57) ABSTRACT

Examples of the present disclosure describe systems and methods for selective export address table filtering. In aspects, the relative virtual address (RVA) of exported function names may be modified to point to a protected memory location. An exception handler may be registered to process exceptions relating to access violations of the protected memory location. If an exception is detected that indicates an attempt to access the protected memory location, the instruction pointer of the exception may be compared to an allowed range of memory addresses. If the instruction pointer address is outside the boundaries, remedial action may occur.

20 Claims, 5 Drawing Sheets

SELECTIVE IMPORT/EXPORT ADDRESS TABLE FILTERING

CROSS-REFERENCE TO RELATED APPLICATIONS

This application is a continuation of and claims a benefit of priority under 35 U.S.C. 120 from U.S. patent application Ser. No. 18/304,231, filed Apr. 20, 2023, issued as U.S. Pat. No. 11,928,206, entitled "SELECTIVE IMPORT/EXPORT ADDRESS TABLE FILTERING," which is a continuation of and claims a benefit of priority under 35 U.S.C. 120 from U.S. patent application Ser. No. 16/683,816, filed Nov. 14, 2019, issued as U.S. Pat. No. 11,636,197, entitled "SELECTIVE IMPORT/EXPORT ADDRESS TABLE FILTERING," which claims a benefit of priority of U.S. Provisional Application No. 62/768,066, filed Nov. 15, 2018, entitled "SELECTIVE IMPORT/EXPORT ADDRESS TABLE FILTERING," which are incorporated herein by reference in their entirety.

BACKGROUND

Various forms of computer exploits utilize vulnerabilities in operating system code to enable attackers to access and/or gain control of process execution. In some exploitation scenarios, a payload comprising malicious shellcode (e.g., position independent machine code) may be supplied to a vulnerable device. In order for the shellcode to achieve the intended malicious intent, the payload needs to identify the APIs required to communicate with the operating system it is working within and bootstrap itself. Generally, the shellcode uses a linear search process to identify the APIs; whereas legitimate/authorized applications use a binary search process.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

Examples of the present disclosure describe systems and methods for selective import and export address table filtering. In aspects, when an executable program is loaded in an operating system's execution environment, an address table filtering (ATF) module is loaded into the address space of a target process associated with the executable program. The ATF module may iterate a list of system library files to identify one or more exported function names. A memory address of the exported function names may be modified to point to a protected memory location. The ATF module may register an exception handler to process accesses of the (pre-modification) memory addresses of the identified exported function names. If the exception handler determines that an access violation caused the detected exception, the address of the instruction pointer associated with the received exception may be compared to the boundaries of the expected system library addresses. If the instruction pointer address is not within the boundaries, the exception handler may trigger a notification indicating an exploit attempt has been detected.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

DETAILED DESCRIPTION

Figure 1:
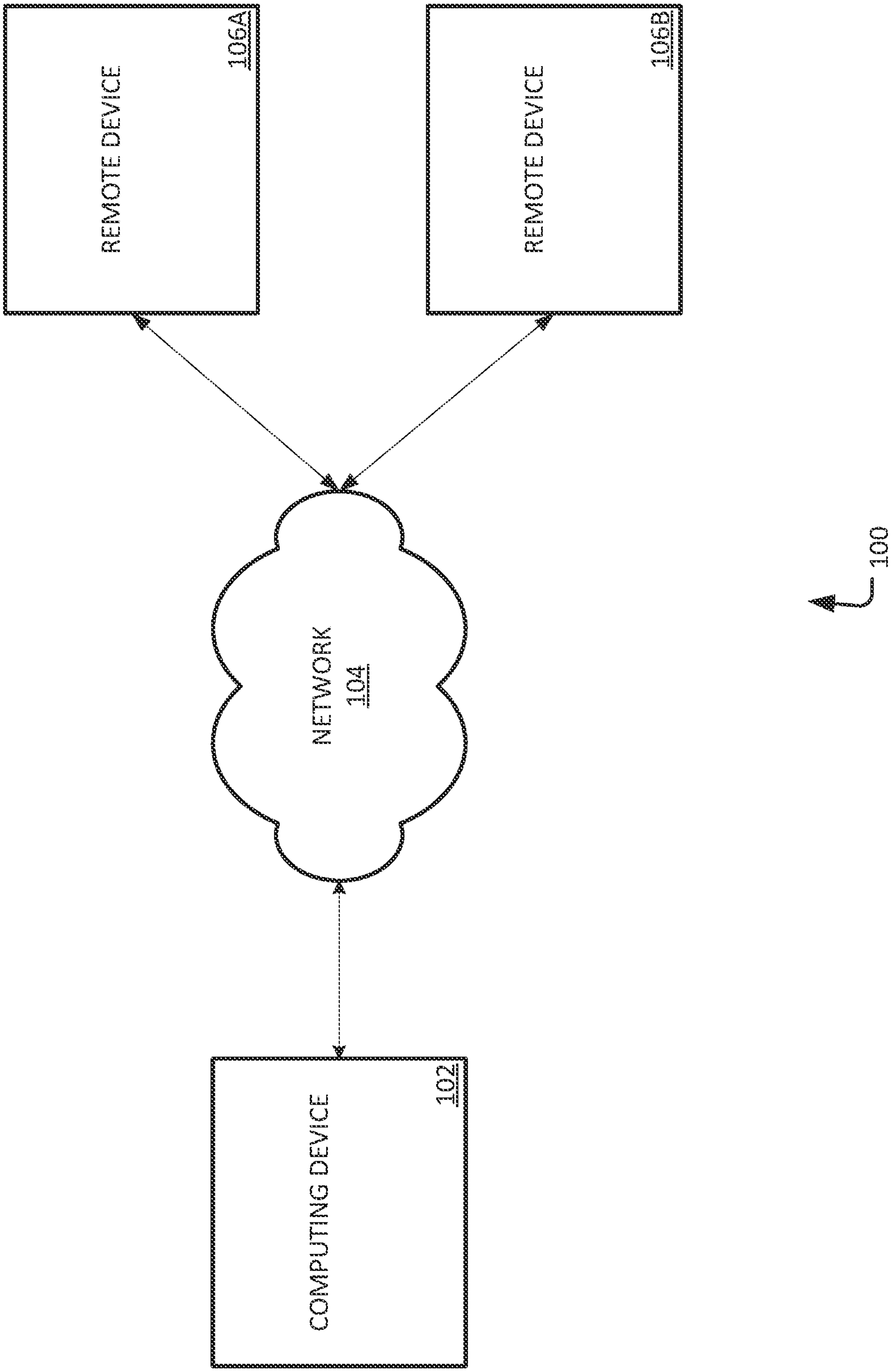
FIG. 1 illustrates an overview of an example system for selective import and export address table filtering as described herein.

Various aspects of the disclosure are described more fully below with reference to the accompanying drawings, which form a part hereof, and which show specific example aspects. However, different aspects of the disclosure may be implemented in many different forms and should not be construed as limited to the aspects set forth herein; rather, these aspects are provided so that this disclosure will be thorough and complete and will fully convey the scope of the aspects to those skilled in the art. Aspects may be practiced as methods, systems or devices. Accordingly, aspects may take the form of a hardware implementation, an entirely software implementation or an implementation combining software and hardware aspects. The following detailed description is, therefore, not to be taken in a limiting sense.

Generally, when an executable program or module is loaded in an operating system's execution environment, the operating system scans one or more address tables to identify functions that have been exported from one or more library files. In the specific example of the Microsoft portable execution (PE) format, exported functions may be identified in the import address tables (IATs) and/or the export address tables (EATs). Typically, authorized (e.g., known and/or non-malicious) applications use the GetProcAddress( ) application programming interface (API) to locate exported functions. The GetProcAddress( ) API retrieves the relative virtual address (RVA) of an exported function from a specified library file or an address table and resolves the RVA location in a module. Unauthorized (e.g., malicious) applications and code often utilize a custom GetProcAddress( ) API. The custom GetProcAddress( ) API is used to locate functions to which the unauthorized code can be bootstrapped, or functions which can be used to otherwise access and/or execute operating system functions. Notably, the custom GetProcAddress( ) API locates the functions using a method that is dissimilar from that used by the authorized GetProcAddress( ) API. The authorized GetProcAddress( ) API performs a binary search in a specified library file or an EAT to locate the relevant function names. The binary search compares the target value or function name to the middle element in the corresponding function name array. If the target value is not determined to be the middle element, the half of the function name array in which the target value cannot be located is eliminated, and the search continues on the remaining half of the function name array (e.g., the target value is compared to the middle element of the remaining half of the function name array). In contrast, the custom GetProcAddress( ) API typically uses an iterative linear search. The linear search iterates over function names in the specified library file or address tables from either the beginning or the end of the function name array.

With the above distinctions between authorized and custom GetProcAddress( ) APIs in mind, the present disclosure describes systems and methods for selective export address table filtering. In aspects, when an executable program is loaded in an operating system's execution environment, an address table filtering (ATF) module is loaded into the memory address space of a target process associated with the executable program. The ATF module may search a list of sources (such as library files or address tables) to identify one or more exportable function names (or name strings) accessible to the executable program. The memory addresses of the identified functions may be stored as relative virtual addresses (RVAs) in the memory address space of a target process. An RVA, as used herein, may refer to the memory address of an object in an image file after the object is loaded into memory, minus the base address of the image file. The ATF module may modify one or more of the function name RVAs to point to a protected or access-restricted memory location. As a specific example, the function name RVAs may be modified by specifying a memory protection constant (such as the PAGE_NOACCESS constant) or by issuing a memory protection command (such as the UNIX mprotect command). In some aspects, only a subset of the function name RVAs identified may be modified to point to a protected memory location. The subset may include function name RVAs that are identified by their positional locations within the list, function name RVAs that are identified by their function names, or some combination thereof. For example, only the function name RVAs listed first and last in an export address table may be modified. As another example, only the function name RVA identified as 'OriginalFirstThunk' in an import address table may be modified. In such aspects, modifying only a subset of function name RVAs may minimize the processing overhead associated with determining whether unauthorized code is attempting to access memory locations. For example, when only the first and last function name RVAs are modified, unauthorized code performing an iterative linear search (which will start at the first or last function) is likely to encounter an access-restricted memory location almost immediately. Accordingly, such attempts are quickly and selectively filtered from the access attempts of authorized programs/modules. Moreover, although each identified function name RVA could be modified to achieve the access filtering steps described above (e.g., by applying, for example, the PAGE GUARD constant to an entire address table), selectively modifying only a subset of the function name RVAs avoids the significant processing overhead that would be incurred by evaluating every attempted access of a function name RVA in an address table.

In aspects, the ATF module may register an exception handler to detect and process exceptions corresponding to attempted accesses of the stored function name RVAs (e.g., the pre-modification function name RVAs). An exception handler, as used herein, may refer to a set of instructions stipulating the action to be taken by a program when an anomalous event that disrupts the normal flow of the program is detected. When the exception handler detects an exception has occurred, the exception handler may evaluate whether a memory access violation caused the exception. In examples, a memory access violation may be caused by an attempt to perform an unauthorized action (e.g., read, write, and/or execute) on a protected memory location. If the exception handler determines that a memory access violation caused the exception, the exception handler may further determine whether the memory access violation was caused by an attempted access of a stored function name RVA. If the exception handler determines an attempt to access a stored function name RVA has occurred, the exception handler may compare the address of the instruction pointer associated with the received exception to the memory address boundaries of the stored function name RVAs. In examples, memory address boundaries may be defined as the memory addresses that span the first and last function name RVA addresses in the stored function name RVAs. If the address of the instruction pointer is determined to be inside of the memory address boundaries of the stored function name RVAs, the thread context for the target process may be updated to point to the stored function name RVA. If, however, the address of the instruction pointer is determined to be outside of the memory address boundaries of the stored function name RVAs, the exception handler may cause one or more remedial actions to be performed. Examples of actions may include generating and displaying warnings and/or notifications, terminating one or more processes, modifying a set of permissions or privilege levels, quarantining one or more files, initiating anti-exploit software/services, etc.

Accordingly, the present disclosure provides a plurality of technical benefits including but not limited to: increasing computing environment security by preventing attackers from gaining unauthorized control of a device, decreasing the computational overhead associated with detecting unauthorized memory access attempts, mitigating unauthorized import and export address table accesses and exploits, and performing automatic corrective action when exploits are detected or suspected, among other examples.

FIG. 1 illustrates an overview of an example system for selective import and export address table filtering, as described herein. Example system 100 presents a combination of interdependent components that interact to form an integrated system for selective import and export address table filtering. Components of such systems may be hardware components or software implemented on, and/or executed by, hardware components of the systems. In examples, system 100 may include hardware components (e.g., used to execute/run operating system (OS)) and/or software components (e.g., applications, application programming interfaces (APIs)), modules, virtual machines, runtime libraries, etc.) executing on hardware. In one example, example system 100 may provide an environment for software components to execute, obey constraints set for operating, and utilize resources or facilities of the system 100. In such an example, components may be software (e.g., application, program, module, etc.) executing on one or more processing devices. For instance, software (e.g., applications, operational instructions, modules, etc.) may be executed on a processing device such as a computer, a mobile device (e.g., smartphone/phone, tablet, laptop, personal digital assistant (PDA), etc.), and/or any other electronic devices. In other examples, the components of systems disclosed herein may be spread across multiple devices. For instance, input may be entered on a client device and information may be processed or accessed from other devices in a network, such as one or more server devices.

System 100, as presented, comprises computing device 102, network environment 104, and remote devices 106A and 106B. One of skill in the art will appreciate that the scale of systems such as system 100 may vary and may include more or fewer components than those described in FIG. 1. In some examples, interfacing between components of the system 100 may occur remotely, for example, where components of system 100 may be spread across one or more devices of a distributed network.

In aspects, computing device 102 may comprise an execution environment for executing executable programs and/or modules. The executable programs and/or modules may be stored locally on computing device 102, stored remotely on one or more remote devices, such as remote devices 106A and 106B, or some combination thereof. Examples of computing devices 102 and remote devices 106A and 106B may include client devices (e.g., a user's laptop or PC, mobile device, wearable device, etc.), server devices, web-based appliances, or the like. In some examples, the executable programs and/or modules may be executed in the execution environment of client device 102 in response to receiving a local execution instruction from client device 102. In other examples, the executable programs and/or modules may be executed on client device 102 in response to receiving an execution instruction from one or more of remote device 106A and 106B via network 106. Upon receiving an execution instruction corresponding to an executable computing program or module, computing device 102 may be configured to load an ATF module into the address space of a target process associated with the executable program or module. When loaded into the execution environment, the ATF module may search a list of library files or an address table accessible to client device 102 to identify one or more exportable function names accessible to the loaded executable program or module. Upon identifying one or more exportable function names, the ATF module may identify one or more memory addresses for at least a portion of the exportable function names. For example, the ATF module may determine the RVA for one or more exportable function names. The EAT filtering module may modify the function name RVA(s) to point to an access-restricted memory location of client device 102.

Client device 102 may be further configured to enable exception handling. In aspects, the ATF module may register an exception handling mechanism with one or more components of client device 102. The exception handling mechanism may detect exceptions (e.g., anomalous events) during the execution of the executable computing program and may stipulate actions to be taken when exceptions are detected. As a specific example, the exception handling mechanism may detect an exception caused by a memory access violation. After detecting the exception, the exception handling mechanism may determine whether the access violation was caused by an attempted access of a modified function name RVA (e.g., a function name RVA modified to point to an access-restricted memory location of client device 102). If the exception handler determines an attempt to access a modified function name RVA has occurred, the exception handler may compare the memory address of the instruction pointer for the received exception to the memory address boundaries of one or more whitelisted modules. If the memory address of the instruction pointer is determined to be outside of the memory address boundaries of the exportable function names, the exception handler may cause client device 102 to initiate one or more remedial actions.

Figure 2:
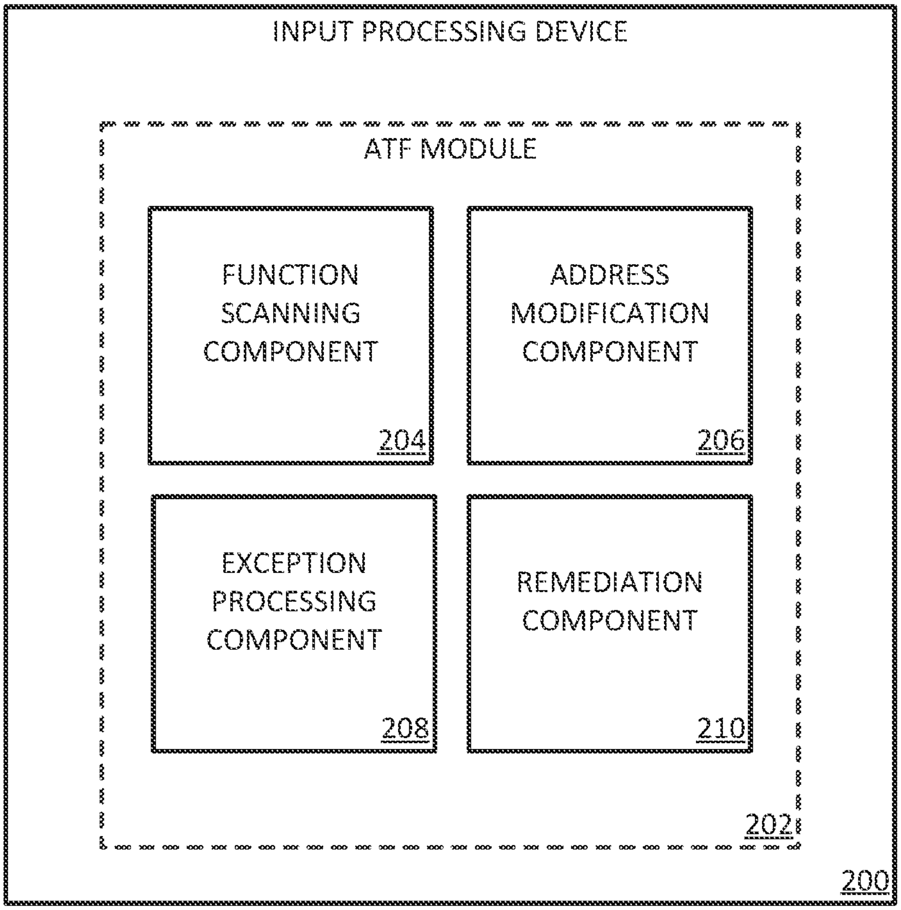
FIG. 2 illustrates an example input processing device for selective import and export address table filtering as described herein.

FIG. 2 illustrates an overview of an example input processing device 200 for selective export address table filtering, as described herein. The selective import and export address table filtering techniques implemented by input processing device 200 may comprise the selective import and export address table filtering techniques and content described in FIG. 1. In alternative examples, a distributed system or one or more devices may perform the processing described in FIG. 1.

With respect to FIG. 2, input processing device 200 may comprise an execution environment (not pictured) for executing programs, modules, and the like. When a program is executed in the execution environment, a loadable module, such as ATF module 202, may be loaded into the memory address space of a process associated with the executed program. In aspects, ATF module 202 may comprise (or otherwise interface with) function scanning component 204, address modification component 206, exception processing component 208, and remediation component 210.

Function scanning component 204 may be configured to identify the function names and corresponding addresses of one or more exportable functions. In aspects, function scanning component 204 may evaluate one or more data sources (such as library files or address tables) to identify a list of functions accessible to a program executing in the execution environment. In some aspects, the data sources to be evaluated may be dynamically determined at some point during the execution of the program. For example, the data sources may be determined based on the program name or identifier, program type, one or more program parameters, operational capabilities of a program, program metadata, the memory footprint of the program, loaded plugins, etc. In other aspects, the data sources to be evaluated may be static and/or defined prior to the execution of the program. For example, a default set of system libraries and/or address tables may be preselected for scanning when ATF module 202 is loaded. After identifying a list of functions, function scanning component 204 may identify and/or collect function information for the identified list of functions. Such function information may include, for example, function name, one or more function addresses, and the functional ordinal number. In at least one example, function scanning component 204 may aggregate and store the identified function information in a single location, such as a temporary address table or similar data structure. The aggregated function information may be stored locally and made accessible to the components of input processing device 200.

Address modification component 206 may be configured to modify the addresses of one or more functions. In aspects, address modification component 206 may access and evaluate the function information collected by function scanning component 204. Evaluating the function information may include identifying the function name RVAs of one or more functions. As a specific example, address modification component 206 may identify the function name RVAs of the first and last function in a list of functions. In some aspects, address modification component 206 may modify one or more identified function name RVAs to point to an alternate memory location. The modification process may include accessing and/or storing the original function name RVA (e.g., the pre-modified function name RVA) in a data structure, assigning an alternate memory address to the function associated with the original function name RVA, and storing the alternate memory address in the data structure. The modification process may further include linking the original function name RVA and alternate memory address in the data structure and/or storing an indication of a link between the original function name RVA and alternate memory address. In a particular example, address modification component 206 may modify one or more function name RVAs to point to a protected or access-restricted memory location, such as a memory location protected with a PAGE_NOACCESS attribute. The modified function name RVA(s) may be stored in a temporary table that also stores an indication of the memory protection attribute/mechanism associated with the modified function name RVA(s).

Exception processing component 208 may be configured to detect and facilitate the processing of exceptions related to the access of one or more identified functions. In aspects, ATF module 202 may use exception processing component 208 to register (or cause the registration of) an exception handler for detecting and processing exceptions corresponding to attempted accesses of memory referenced by one or more modified function name RVAs of the functions identified by function scanning component 204. An exception handler may be structured, vectored, synchronous, asynchronous, or language-specific. Exception processing component 208 may create and maintain the exception handler and/or register the exception handler with an executing program. When the exception handler detects an exception has occurred, the exception handler may evaluate whether a memory access violation caused the exception. If the exception handler determines that a memory access violation caused the exception, the exception handler may determine whether the memory access violation was caused by an attempted access of an original function name RVA in the list of functions. In examples, determining whether the memory access violation was caused by an attempted access of an original function name RVA may comprise determining whether a portion of data in the exception (e.g., an address, a name string, etc.) matches data associated with the original function name RVA. If the exception handler determines an attempt to access an original function name RVA has occurred, the exception handler may compare the address of the instruction pointer associated with the received exception to the memory address boundaries of the allowed system binaries or functions. If the address of the instruction pointer is determined to be inside of the memory address boundaries of the allowed system binaries or functions, the thread context of the process causing the exception may be updated to point to the function name string referenced by the original function name RVA. In examples, determining whether instruction pointer address is within the function address boundaries may include comparing the instruction pointer address to one or more authorized (e.g., whitelisted or greylisted) system binaries or one or more unauthorized (e.g., blacklisted or non-system) system binaries. If, however, the address of the instruction pointer is determined to be outside of the memory address boundaries of the allowed system binaries or functions, exception processing component 208 may create and transmit an indication of anomalous or suspicious activity.

Remediation component 210 may be configured to perform one or more remediation actions when anomalous or suspicious activity is identified. In aspects, remediation component 210 may receive (or otherwise have access to) an indication of anomalous or suspicious activity. Remediation engine 210 may evaluate an indication of anomalous or suspicious activity to determine an appropriate set of actions that may be performed to remedy or mitigate the threat of the indicated activity. Evaluating an indication of anomalous or suspicious activity may comprise parsing the indication to identify an identifier or keyword and using the identified information to determine a threat type. In some examples, remediation component 210 may use the determined threat type to initiate (or suggest the initiation of) an action. In other examples, remediation component 210 may initiate (or schedule the initiation of) an action based on an on-demand user request or the fulfillment of a set of criteria. Non-exhaustive examples of actions available to remediation component 210 may include installing or executing exploit prevention software, pausing or terminating an executing program, quarantining a file or module, removing one or more privileges from a module or program, blacklisting a module or program, displaying a warning message comprising user-selectable options for the executing program, and generating an activity report.

Figure 3:
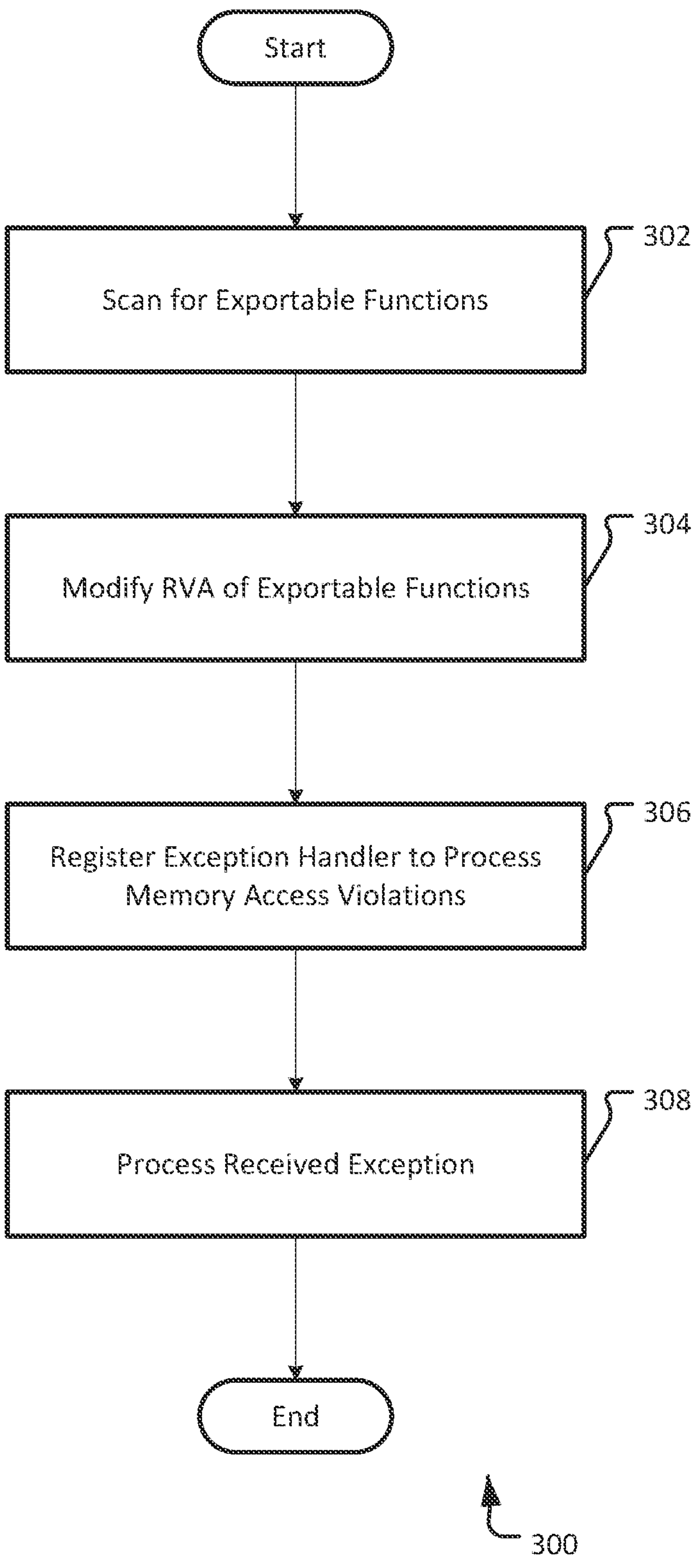
FIG. 3 illustrates an example method for selective import and export address table filtering as described herein.
Figure 4:
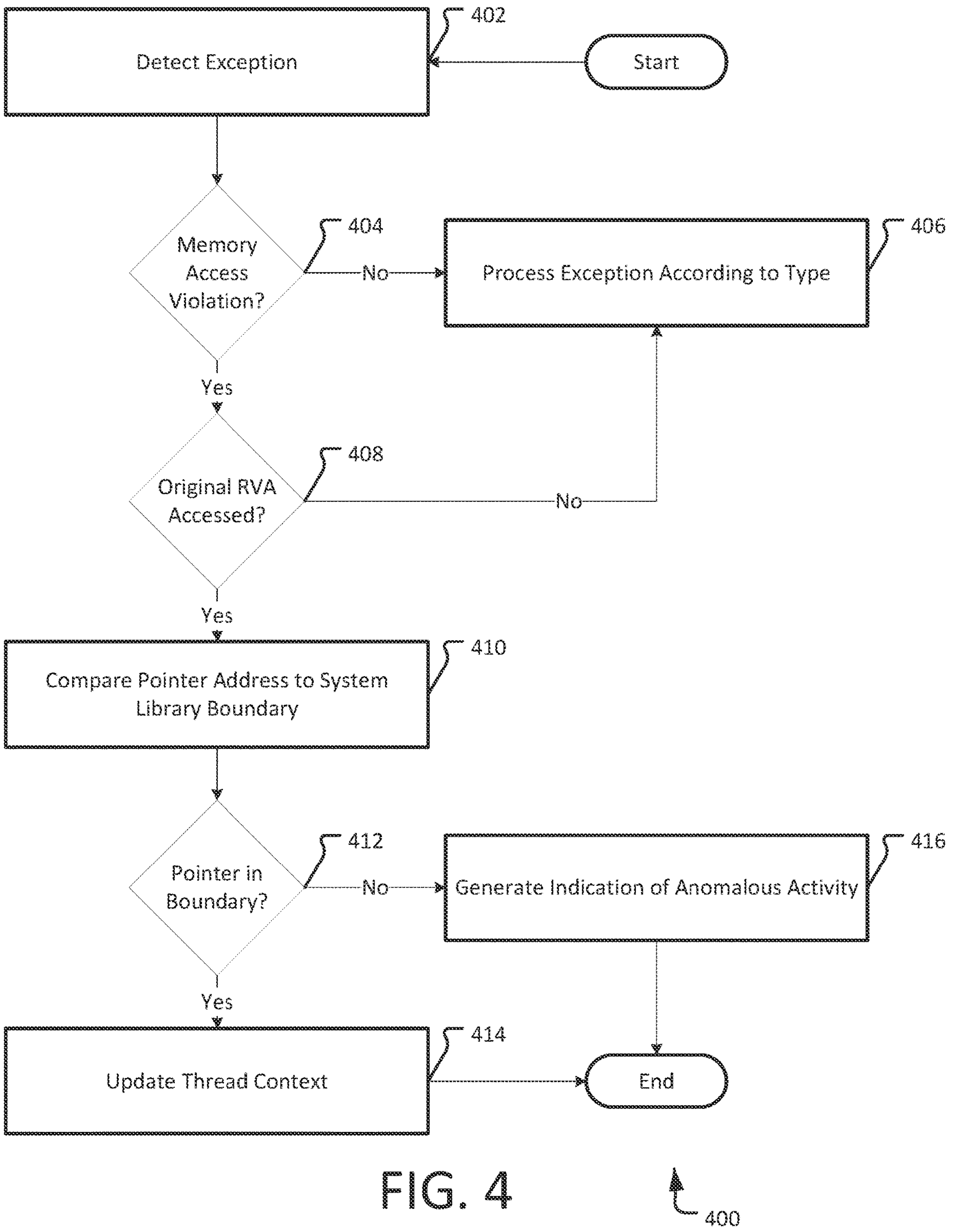
FIG. 4 illustrates an example method for processing exceptions using the selective import and export address table filtering techniques described herein.

FIGS. 3 and 4 illustrate example methods 300 and 400 associated with selective import and export address table filtering, as described herein. In aspects, methods 300 and 400 may be executed by an example system, such as system 100 of FIG. 1. In such aspects, methods 300 and 400 may be executed on a local device comprising at least one processor configured to store and execute operations, programs or instructions. However, methods 300 and 400 are not limited to such aspects. In other aspects, methods 300 and 400 may be performed by a remote application or service. In yet other aspects, methods 300 and 400 may be executed (e.g., computer-implemented operations) by one or more components of a distributed network, such as a web service or distributed network service (e.g., cloud service).

FIG. 3 illustrates an example method for selective import and export address table filtering. Example method 300 begins at operation 302, where an ATF module scans for one or more accessible, exportable functions. In aspects, when an executable program is loaded/executed in an operating system's execution environment, an ATF module may be loaded into the memory address space of a target process associated with the executable program. Once loaded, the ATF module may scan one or more data sources to identify exportable functions accessible to the executable program. For example, the ATF module may scan a list of preselected system libraries located in one or more address tables associated with the executable program. The system libraries may be preselected based on a manual or automatic analysis of locations known (or suspected) to be searched or accessed by unauthorized code, such as malicious shellcode. After one or more exportable functions have been identified, function information (e.g., function name, function address, function name address, ordinal number, etc.) for the identified exportable functions may be identified and/or collected. For example, the function name and function name RVA for a list of exportable functions associated with the preselected libraries may be identified and/or stored in a temporary data structure.

At operation 304, one or more addresses for a list of exportable functions may be modified. In aspects, the function name RVAs for one or more functions in the list of exportable functions associated with the preselected libraries may be identified. The process of identifying the function name RVAs may include using a scanning mechanism, such as function scanning component 204, to search the function information or to use the function information to lookup the function name RVAs in a table or similar data structure. In some examples, each (or substantially all) of the function name RVAs identified may be modified. In other examples, only a subset of the function name RVAs identified may be modified. For instance, only the first and last exported function name RVAs from a set of system libraries may be modified. In aspects, modifying a function name RVA may include accessing and/or storing the original function name RVA (e.g., the pre-modified function name RVA) in a data structure, assigning an alternate memory address to the function associated with the original function name RVA, and/or storing the alternate memory address in the data structure. For example, the module '123alloc.dll' may export a function identified by the name '123_alloc' to an executing program. The RVA for '123_alloc' may be recorded as '0x1000' in the export address table for the executing program. The ATF module may modify the RVA to point to a restricted or protected memory location, such as a PAGE_NOACCESS page mapped to '0x01.' After the modification, resolving the name string for the function identified by the name '123_alloc' will direct requestors to the PAGE_NOACCESS page. In examples, resolving the name string may include identifying the function name RVA of the function and adding the function name RVA to the base address of the image file.

At operation 306, an exception handler may be registered to process exceptions relating to memory access violation. In aspects, the ATF module may register an exception handler with an exception handler component, such as exception processing component 208, to detect and process exceptions that occur during the execution of the executable program. Generally, the exception handler will be configured to monitor at least for exceptions relating to an attempted access of a function in the list of exportable functions associated with the preselected libraries. The exception handler registration process may include using an exception handling mechanism, such as exception processing component 208 to register (or cause the registration of) the exception handler. In examples, an exception handler may be structured, vectored, synchronous, asynchronous, language-specific, or some combination thereof. The exception handling mechanism may monitor and maintain a registered exception handler.

At operation 308, a received exception may be processed. In aspects, the registered exception handler may determine that an exception has occurred when an attempted access of a function in the list of exportable functions associated with the preselected libraries is detected. Upon detecting an exception has occurred, the exception handler (or the exception handling mechanism) may evaluate whether a memory access violation caused the exception. The evaluation process may include the use of one or more parsing and/or search techniques, such as regular expressions, fuzzy logic, or pattern recognition modeling. For instance, continuing with the above example, the exception handler may evaluate an exception to determine whether the memory address for a protected memory location (e.g., '0x01') is found. If it is determined that a memory access violation caused the exception, it may be further determined whether the memory access violation was caused by an attempted access of an original function name RVA in the list of exportable functions. The process for determining whether the memory access violation was caused by an attempted access of an original function name RVA in the list of exportable functions may include using the memory location indicated by the exception to perform a search or lookup operation in a data structure associating the memory location indicated by the exception to a corresponding original function name RVA. If the exception handler determines an attempt to access an original function name RVA has occurred, the exception handler may compare the address of the instruction pointer associated with the received exception to the memory address boundaries of the list of exportable functions. If the address of the instruction pointer is determined to be inside of the memory address boundaries of the list of exportable functions, the thread context of the process causing the exception may be updated to point to the original function name RVA. If, however, the address of the instruction pointer is determined to be outside of the memory address boundaries of the list of exportable functions, an indication of anomalous or suspicious activity may be generated.

FIG. 4 illustrates an example method for processing exceptions. Example method 400 begins at operation 402, where an exception handler registered using an exception handler mechanism, such as exception processing component 208, may detect that an exception has occurred. At decision operation 404, the exception handler may determine (or cause the determination of) whether a memory access violation caused the exception. In aspects, determining whether a memory access violation caused the exception may include applying one or more searching utilities to the exception or to information associated with the exception. If it is determined that a memory access violation did not cause the exception, flow proceeds to operation 406. At operation 406, the exception may be processed normally according to exception type or exception object name. If it is determined that a memory access violation caused the exception, flow proceeds to decision operation 408.

At decision operation 408, the exception handler may determine whether the exception corresponds to an attempt to access an identified function name RVA. In aspects, a function name RVA corresponding to an exportable function accessible to an executable program for which the exception was thrown, may have been previously identified. If the exception handler determines the exception does not correspond to an attempt to access an identified function name RVA, flow proceeds to operation 406. If the exception handler determines the exception corresponds to an attempt to access an identified function name RVA, flow proceeds to operation 410. At operation 410, the address associated with the instruction pointer of the received exception may be identified using any known techniques. At decision operation 412, the address associated with the instruction pointer may be compared to one or more memory addresses or the memory address boundaries of a whitelisted system binary. In aspects, the memory address boundaries may correspond to the first and last functions listed or represented in the whitelisted system binary. Alternately, the memory address or memory address boundaries may correspond to one or more specified function names, such as 'OriginalFirstThunk.' If the comparison indicates that the address of the instruction pointer is within the memory address boundaries of a whitelisted system binary, flow proceeds to operation 414.

At operation 414, the thread context of the process causing the exception may be updated to point to the original function name RVA. In aspects, updating the thread context may enable the program or module to access an exportable function for which the corresponding function name RVA has been modified. If the comparison indicates that the address of the instruction pointer is not within the memory address boundaries of a whitelisted system binary, flow proceeds to operation 416. At operation 416, an indication of anomalous or suspicious activity may be generated. In aspects, the indication may be used to prompt the performance of one or more remedial actions. For instance, the indication may be provided to a remediation mechanism, such as remediation component 210. Examples of remedial actions may include installing or executing exploit prevention software, pausing or terminating an executing program or module, quarantining a file or module, removing or modifying access privileges, adding programs/modules to one or more lists, displaying warnings, and generating an activity report.

Figure 5:
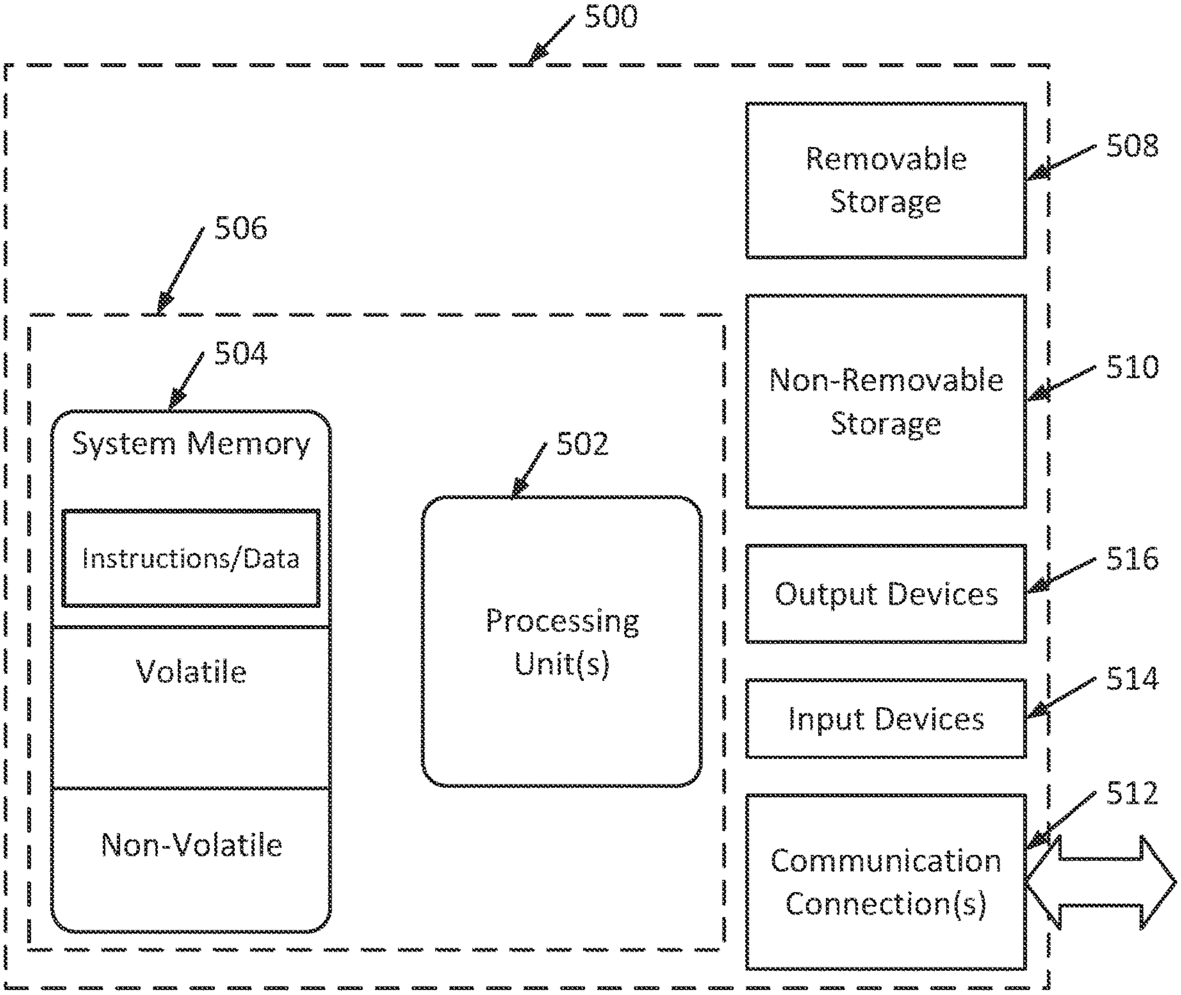
FIG. 5 illustrates one example of a suitable operating environment in which one or more of the present embodiments may be implemented.

FIG. 5 illustrates one example of a suitable operating environment 500 in which one or more of the present embodiments may be implemented. This is only one example of a suitable operating environment and is not intended to suggest any limitation as to the scope of use or functionality. Other well-known computing systems, environments, and/or configurations that may be suitable for use include, but are not limited to, personal computers, server computers, hand-held or laptop devices, multiprocessor systems, microprocessor-based systems, programmable consumer electronics such as smart phones, network PCs, minicomputers, mainframe computers, distributed computing environments that include any of the above systems or devices, and the like.

In its most basic configuration, operating environment 500 typically includes at least one processing unit 502 and memory 504. Depending on the exact configuration and type of computing device, memory 504 (storing, among other things, address table information, instructions to perform the methods disclosed herein, etc.) may be volatile (such as RAM), nonvolatile (such as ROM, flash memory, etc.), or some combination of the two. This most basic configuration is illustrated in FIG. 5 by dashed line 506. Further, environment 500 may also include storage devices (removable, 508, and/or non-removable, 510) including, but not limited to, magnetic or optical disks or tape. Similarly, environment 500 may also have input device(s) 514 such as keyboard, mouse, pen, voice input, etc. and/or output device(s) 516 such as a display, speakers, printer, etc. Also included in the environment may be one or more communication connections, 512, such as LAN, WAN, point to point, etc.

Operating environment 500 typically includes at least some form of computer readable media. Computer readable media can be any available media that can be accessed by processing unit 502 or other devices comprising the operating environment. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information. Computer storage media does not include communication media.

Communication media embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The operating environment 500 may be a single computer operating in a networked environment using logical connections to one or more remote computers. The remote computer may be a personal computer, a server, a router, a network PC, a peer device or other common network node, and typically includes many or all of the elements described above as well as others not so mentioned. The logical connections may include any method supported by available communications media. Such networking environments are commonplace in offices, enterprise-wide computer networks, intranets and the Internet.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of the claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A system comprising:

one or more processors; and memory coupled to at least one of the one or more processors, the memory comprising computer executable instructions that, when executed by the one or more processors, performs a method comprising:

receiving a list of exportable functions accessible to an executing program, the exportable functions each having an exportable function name string;

referencing a relative virtual address (RVA) of one or more of the list of exportable function name strings in a memory space of the executing program to a protected memory location, wherein the RVA was previously mapped to a different memory location;

processing a received exception, the received exception occurring in response to attempted access of the protected memory location, wherein the processing comprises determining whether a memory address of the received exception is within an allowed range of memory addresses; and in response to determining the memory address of the received exception is not within the allowed range of memory addresses, pausing or terminating the executing program.

2. The system of claim 1, wherein the list of exportable functions is received from an address table filtering module loaded into a memory address space of a target process associated with the executable program.

3. The system of claim 2, wherein the address table filtering module scans a list of preselected system libraries located in one or more address tables associated with the executable program.

4. The system of claim 1, wherein the one or more processors are configured to modify the RVA based on:

storing an original function name RVA of a function in a data structure;

assigning an alternate memory address to the function; and storing the alternate memory address in the data structure.

5. The system of claim 1, wherein determining whether the memory address of the received exception is within the allowed range of memory addresses comprises comparing an address of an instruction pointer associated with the received exception to a memory address boundary of the exportable function name strings.

6. The system of claim 1, wherein, when a memory address of the received exception is determined to be within the expected address range, a thread context of a target process associated with the executable program is updated to point to a stored function name RVA.

7. The system of claim 1, wherein, when a memory address of the received exception is determined to be outside the expected address range, an additional remedial action is performed.

8. The system of claim 1, wherein referencing the RVA of the one or more of the list of exportable function name strings further includes modifying the RVA to point to the protected memory location.

9. The system of claim 1, wherein the one or more processors are further configured to retrieve the RVA of the one or more of the list of exportable function name strings from at least one of a specified library file and an address table.

10. The system of claim 9, wherein the one or more processors are further configured to resolve a location of the RVA in a module.

11. The system of claim 1, wherein the one or more processors are further configured to use an application programming interface (API) to perform a binary search in at least one of a library file and an expert address table (EAT) to locate the list of exportable function name strings.

12. The system of claim 11, wherein the one or more processors are further configured to perform the binary search by comparing a target value to a middle element in a corresponding function name array.

13. The system of claim 12, wherein the one or more processors are further configured to determine whether the target value is the middle element, and if not, eliminate half of the corresponding function name array.

14. The system of claim 13, wherein the one or more processors are further configured to continue the binary search for a remaining half of the corresponding function name array by comparing a new middle element of the remaining half.

15. The system of claim 1, wherein the one or more processors are further configured to use an application programming interface (API) to perform an iterative linear search to locate the list of exportable function name strings.

16. A method comprising:

receiving a list of exportable functions accessible to an executing program, the exportable functions each having an exportable function name string;

referencing a relative virtual address (RVA) of one or more of the list of exportable function name strings in a memory space of the executing program to a protected memory location, wherein the RVA was previously mapped to a different memory location;

processing a received exception, the received exception occurring in response to attempted access of the protected memory location, wherein the processing comprises determining whether a memory address of the received exception is within an allowed range of memory addresses; and in response to determining the memory address of the received exception is not within the allowed range of memory addresses, pausing or terminating the executing program.

17. The method of claim 16, further comprising:

loading the executable program in an execution environment of an operating system; and in response to loading the executable program, loading an address table filtering module into a memory address space of a target process associated with the executable program.

18. The method of claim 16, wherein the list of exportable functions is determined by evaluating one or more data sources accessible to the executable program, the one or more data sources including at least one of a library file and an address table.

19. The method of claim 16, wherein the list of exportable functions is determined by:

identifying function data comprising a function name, a function address, and a function ordinal number; and storing the function data in a temporary address table.

20. A computer-readable storage device storing computer executable instructions that when executed cause a computing system to perform a method comprising:

receiving a list of exportable functions accessible to an executing program, the exportable functions each having an exportable function name strings;

referencing a relative virtual address (RVA) of one or more of the list of exportable function name strings in a memory space of the executing program to a protected memory location, wherein the RVA was previously mapped to a different memory location;

processing a received exception, the received exception occurring in response to attempted access of the protected memory location, wherein the processing comprises determining whether a memory address of the received exception is within an allowed range of memory addresses; and in response to determining the memory address of the received exception is not within the allowed range of memory addresses, pausing or terminating the executing program.

* * * * *